United States Patent [19]

Morishita et al.

[11] Patent Number: 4,690,320
[45] Date of Patent: Sep. 1, 1987

[54] METHOD OF BONDING POROUS METALLIC MEMBERS AND PRODUCT MADE BY THE METHOD

[75] Inventors: Tsuyoshi Morishita; Sigemi Osaki; Noriyuki Sakai, all of Hiroshima, Japan

[73] Assignee: Mazda Motor Corporation, Hiroshima, Japan

[21] Appl. No.: 9,094

[22] Filed: Jan. 29, 1987

Related U.S. Application Data

[63] Continuation of Ser. No. 703,406, Feb. 20, 1985, abandoned.

[30] Foreign Application Priority Data

Feb. 24, 1984 [JP] Japan .................................. 59-33748

[51] Int. Cl.[4] ...................... B23K 20/16; B23K 20/22
[52] U.S. Cl. ................................... 228/194; 228/248; 228/263.13; 228/263.15
[58] Field of Search ................. 228/248, 263.15, 194, 228/263.13

[56] References Cited

U.S. PATENT DOCUMENTS

| | | | |
|---|---|---|---|
| 3,675,311 | 7/1972 | Wells | 228/194 |
| 3,716,347 | 2/1973 | Bergstrom et al. | 228/248 |
| 3,984,044 | 10/1976 | Breton et al. | 228/248 |

FOREIGN PATENT DOCUMENTS 57-89412 6/1982 Japan .
58-34524 7/1983 Japan .

Primary Examiner—Nicholas P. Godici
Assistant Examiner—Samuel M. Heinrich
Attorney, Agent, or Firm—Fleit, Jacobson, Cohn & Price

[57] ABSTRACT

A method of bonding two metallic members at least one of which is of a porous structure. The method comprises steps of using, as the brazing material, a metallic material containing an eutectic alloy which contains an element having a superior diffusion property to the porous metallic member or, alternatively, an alloy which can form the eutectic alloy, placing the brazing material between the metallic members, heating the brazing material and the metallic members to a temperature above the melting point of the brazing material, and cooling the metallic members and the brazing material.

7 Claims, 4 Drawing Figures (X 100)

BRAZING MATERIAL (X 200)

(X 200)

(X 200)

METHOD OF BONDING POROUS METALLIC MEMBERS AND PRODUCT MADE BY THE METHOD

This application is a continuation of application Ser. No. 703,406, filed Feb. 20, 1985, abandoned Mar. 2, 1987.

BACKGROUND OF THE INVENTION

1. Field of the Invention

The present invention relates to a method of bonding porous members together and, more particularly, to a method which utilizes, as a brazing material, a metallic material containing an eutectic alloy which in turn contains an element having a superior diffusion property to porous metallic materials. The invention is also concerned with a product which includes porous members bonded by such a method.

2. Description of the Prior Art

Various methods have been proposed for bonding porous members such as those made of sintered alloys. For instance, there has been proposed a method in which two members each consisting of compacted powders or, alternatively, one member consisting of compacted powders and the other member made of a sintered material, are bonded by being heated and sintered together while they are held in a mutually fitting relation. A typical example of this method is disclosed in Japanese Pat. Laid-Open No. 57-89412. According to another method proposed hitherto, two porous members are bonded together through a brazing material by making use of peritectic reaction as taught, for example, by Japanese Patent Publication No. 58-34524.

Generally, bonding two members in solid phase by sintering essentially requires that the two members to be bonded be heated while they are pressed in close contact with each other at their bonding surfaces. Various methods have been proposed to achieve such a condition. For instance, it has been proposed to shape two members such that they have complementary or mating configurations. It has also been proposed to select the materials of two members such that the outer member exhibits a greater contraction than the inner member. These methods, however, are applicable only to specific cases and cannot be used broadly as a generic measure.

Problems are also encountered in the known methods for bonding two porous members through a brazing material by making use of peritectic reaction. For example, when a continuous heating furnace of mesh belt type or pusher type is used for heating two porous members to be bonded, these members tend to be offset from each other during the heating process due to impact and vibration imparted by the conveyor device of the furnace since the two cannot be securely fitted together under a high temperature. In addition, the mechanical property of the product is liable to be impaired due to coarsening of the grain structures of two members, due to the fact that the bonding is effected at a high temperature.

Furthermore, since the pores of two members are filled with the brazing material, a large amount of brazing material is consumed and the advantages peculiar to the porous material are impaired because the pores are lost. Finally, it is to be pointed out that the strength of bonding attained by this method is generally insufficient.

OBJECT OF THE INVENTION

Accordingly, an object of the invention is to provide a method of bonding porous members capable of obviating the above-described problems of the prior art.

Another object is to provide a product in which porous members are bonded without impairing the advantages of the porous material.

SUMMARY OF THE INVENTION

These objects of the invention are achieved by using, as the brazing material, a metallic material containing an eutectic alloy which in turn contains an element which exhibits a superior diffusion property to the porous metallic members to be bonded.

According to one aspect of the invention, there is provided a method of bonding two metallic members at least one of which is of a porous structure, the method comprising steps of using, as the brazing material, a metallic material containing an eutectic alloy containing an element which exhibits a superior diffusion property to the porous metallic member or, alternatively, an alloy which can form the eutectic alloy; placing the brazing material between the metallic members; heating the brazing material and the metallic members to a temperature above the melting point of the brazing material; and cooling the metallic members and the brazing material.

According to another aspect of the invention, there is provided a metallic product including two metallic members bonded together by the aid of a metallic brazing material containing an eutectic alloy, at least one of the metallic members being porous, the product being characterized in that the pores of the metallic members are filled with the brazing material only in the regions adjacent the bonding surfaces, and that the brazing material filling the pores have compositions which are different from the eutectic composition due to diffusion of the element having superior diffusion characteristic from the brazing material into the metallic members.

According to the invention, the eutectic alloy in the molten state fills the pores of the porous members and, among the elements of the eutectic alloy filling the pores, the element which has superior diffusion property is diffused into the materials of the porous members. In consequence, the eutectic condition of the eutectic alloy is lost and a solid phase of high melting point is generated to block the pores to prevent any further filling of pores by the eutectic alloy, in the region around the boundary between the eutectic alloy and the porous metallic members. Thus, the filling of pores takes place only in the region around the bonding surface so that most of the pores remain unfilled. Consequently, the porous members are strongly bonded metallurgically without impairing the advantages of the porous material.

The brazing material used in the method of the invention can have various forms such as compacted powder, powder shaped into a sheet by means of an organic binder, powder as it is, foil, plate, tape and so forth. Among these forms, powder shaped into a sheet by organic binder can be used most suitably.

The powder sheet is prepared by mixing an alloy powder of grain size smaller than 150 mesh with a suitable amount of binder and pressing and shaping the mixture while applying heat as required. The powder sheet may be formed by adding a suitable amount of solvent to the alloy powder and an organic binder, and shaping the mixture into a sheet by, for example, rolling.

For bonding the members through the aid of the brazing material in the form of a sheet, the brazing material is sandwiched and fixed between two members through intermediaries of layers of a bonding agent. If the brazing material in the form of a sheet contains an organic binder which exhibits a bonding characteristic, the layers of the bonding agent may be omitted. Namely, in such a case, the brazing material is directly fixed to the members to be bonded.

An adhesive consisting of an acrylic resin can be used most suitably as the organic binder and the bonding agent. Preferably, polymers and copolymers of an ester acrylate and an ester methacrylate, as well as copolymers of these esters and polymeric monomers having functional group copolymerizable with these esters, are usable as the acrylic resin as the organic binder and adhesive.

The mixing ratio between the adhesive which is the acrylic resin and the alloy powder is preferably such that the adhesive content ranges between 10 to 1 wt % while the alloy powder content ranges between 90 to 99 wt %. When the adhesive content is smaller than 1 wt %, the sheet becomes brittle due to insufficient adhesion so that the sheet cannot exhibit required flexibility. On the other hand, any adhesive content greater than 10 wt % causes an insufficient bonding due to many pores and cavities left in the brazing layer because of excessive resin content.

When the method of the invention is applied to the bonding of ferrous porous members, a ternary alloy of Fe-M-C system can be used suitably as the brazing material. In this ternary alloy, one of Mo, B and P or a mixture of two or more of these elements, is preferably used as the M. The use of P and C is preferred because they exhibit superior diffusion property to ferrous metals. It is also preferred that the brazing material contains at least one of Cr, V, W, Nb, Ta and Ti as the subsidiary element. In other words, the powdered alloy constituting the eutectic alloy suitable for use as the brazing material has a component which forms the eutectic alloy and a component which forms an alloy of a high melting point.

More specifically, the brazing material is prepared from an alloy powder mixture which includes: 30 to 70 wt % of Fe-Cr alloy powder of a size less than 150 mesh and essentially consisting of 10.0 to 15.0 wt % of Cr, not greater than 1.5 wt % of at least one of C,P,Si,S,Mn and Ni and the balance substantially Fe; and 70 to 30 wt % of powder of Fe-C-P-Mo alloy of a size less than 150 mesh and essentially consisting of 3.5 to 4.5 wt % of C, 1.8 to 2.8 wt % of P, 8 to 12 wt % of Mo, not greater than 4 wt % of at least one of Cr, Si, S, Mn and Ni, and the balance substantially Fe. A mixture is formed to contain 90 to 99 wt % of the above-mentioned alloy powder and 10 to 1 wt % of the above-mentioned acrylic resin adhesive, and the mixture is kneaded with a suitable solvent such as acetone, toluene or the like, and a powder sheet usable as the brazing material is formed from the kneaded mixture by, for example, rolling.

The sheet of brazing material thus formed is placed between the members to be bonded with or without the intermediary of bonding agent layer, and is fixed by being pressed through these members. Preferably, the resin of the same composition as the acrylic resin used as the adhesive mentioned before is used as the bonding agent. The layer of the bonding agent can be formed without difficulty by applying to the members a solution which is prepared by dissolving the adhesive in a suitable solvent or adhering an adhesive tape which is formed by applying the solution to a carrier such as a silicone sheet and then evaporating the solvent.

The integral body consisting of the members to be bonded and the brazing material placed therebetween is heated and fired. In order to prevent any oxidation of the alloy powder, as well as the oxidation of the adhesive when the adhesive is used, the heating should be conducted in a non-oxidizing atmosphere. An inert gas such as nitrogen and argon, and reducing gas such as hydrogen, as well as vacuum, may be used as the heating atmosphere.

Preferably, the heating is effected at a temperature rising speed or heating rate of 40° C./min or less. When the heating is effected at a rate greater than 40° C./min, various troubles are caused by a rapid evaporation of the low-melting point component in the adhesive, such as a breakage of the powder sheet, separation of the brazing material from the porous member due to formation of voids, and undesirable movement of the brazing material relative to the porous member.

When the brazing material contains an adhesive of an acrylic resin, or when the bonding agent is used, the integral body consisting of the members to be bonded and the brazing material is preferably pre-heated before being heated up to the sintering temperature. The pre-heating is made for 5 minutes or longer at a temperature of between 150° C. and 380° C., preferably between 200° C. and 350° C. As a result of this pre-heating, the synthic resin used as the adhesive is not completely burnt but forms a tar- or pitch-like substance through polymerization and condensation. This tar- or pitch-like substance ensures a bonding strength which is large enough to maintain the weight and the shape of the alloy powder sheet even at high temperature above 300° C. Therefore, the dropping or separation of the alloy powder sheet is avoided even when a vibration or impact is imparted to the members to be bonded during the conveying of the members. If the pre-heating is conducted at a temperature below 150° C., the thermal decomposition of the resin component proceeds only insufficiently so that the generation of the tar- or pitch-like substance is quite insufficient. On the other hand, when the pre-heating is conducted at a temperature above 380° C., the resin component is decomposed so quickly so that only a small bonding strength is obtained also in this case due to too small generation of the tar- or pitch-like substance.

Pre-heating time shorter than 5 minutes is too short to obtain sufficiently large amount of tar- or pitch-like substance. With such a short pre-heating time, therefore, the aimed bonding strength cannot be obtained. Practically, the pre-heating time is determined in view of various factors such as the pre-heating temperature, kind of the resin used as the adhesive, and so forth. Generally, however, the pre-heating time longer than 120 minutes is unnecessary and uneconomical.

The pre-heated porous members and the brazing material are then heated to a temperature above the solidus of the brazing material thus accomplishing the brazing. During this heating, the component of the molten eutectic alloy having the superior diffusion property to the porous metallic member is diffused through the porous metallic member. At the same time, the components of the porous metallic member, mainly iron, is diffused into the eutectic alloy. In consequence, the eutectic condition of the alloy is lost and a solid phase having a high melting temperature is formed. This phenomenon will be explained in detail hereinunder with reference to an example using an Fe based alloy having a density of 6.50 g/cm³ and containing 0.4 wt % of C and the balance substantially of Fe as the material for the porous members a mixture of an Fe-Cr type alloy powder and Fe-C-P-Mo type alloy powder as the brazing material. For the purpose, reference is made to the accompanying drawings.

DESCRIPTION OF THE PREFERRED EMBODIMENT

Figure 1:
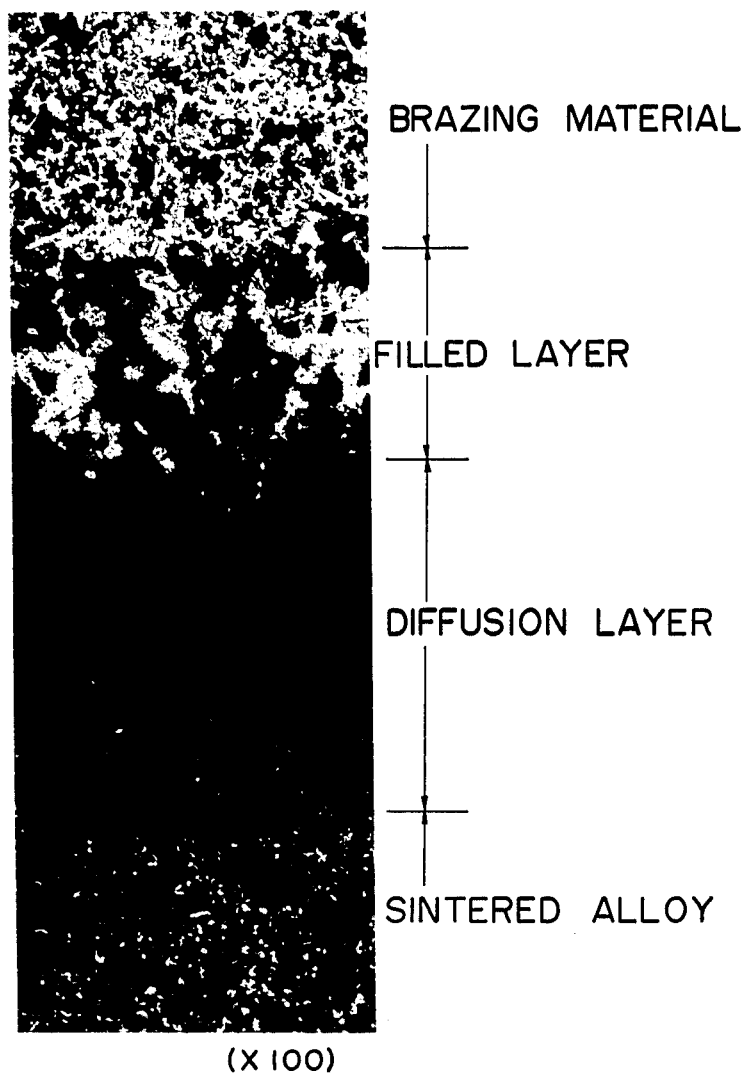
FIG. 1 is a microscopic photograph of a section in the bonding region of a structure formed by the use of a bonding method in accordance with the invention.

Referring to FIG. 1 which is a microscopic photograph of the bonding region formed in accordance with the Example mentioned above, it will be seen that the eutectic portion of the brazing material is rich in C, P and Mo. This portion is molten when heated to a level above 1030° C., but other portions are maintained in the solid state, so that the Fe-C-P-Mo alloy as a whole is maintained in a half-molten state. On the other hand, the Fe-Cr alloy remains in the solid state. Since the solid phase portion of the Fe-C-P-Mo alloy and Fe-Cr alloy have good wettability to the molten portion of the brazing material, the molten portion gradually wrap the powders and the grain particles while expelling the internal voids to the outside. Thus, a liquid-phase sintering proceeds and the structure comes to exhibit a true density as a result of a contraction. The matrix of the porous Fe-C type sintered alloy also exhibits a good wettability to the molten portion of the brazing material so that the molten portion comes into the pores of the porous material.

As stated before, when an ordinary brazing material such as copper or silver is used, a large amount of brazing material is consumed for filling numerous pores because the brazing material is completely molten. In contrast, in the method of the invention, the brazing material is not perfectly molten but is maintained in a half-molten state. Namely, only the eutectic portion of the Fe-C-P-Mo type alloy is molten, while other portions of the alloy and Fe-Cr alloy are maintained in the solid states. Therefore, only the molten eutectic portion fills the pores of the porous member and makes contact with the Fe-C alloy constituting the matrix of the porous member. This contact permits a rapid diffusion of the C, P and Mo content of the molten liquid into the matrix, as well as diffusion of Fe from the porous member into the eutectic portion. In consequence, the eutectic condition is lost so that the melting point is raised to allow the molten portion to be solidified. As a result, the effective pores, i.e., the continuous pores, in the porous metals are blocked thus preventing further filling of the pores with the molten portion of the brazing material.

As will be understood from the foregoing description, according to the bonding method of the invention, the brazing material is metallurgically bonded to the porous material so that a sufficiently high bonding strength can be obtained. In addition, since the filling of the pores takes place only in the region around the bonding surface, the consumption of the brazing material can be reduced advantageously.

As has been described, according to the invention, it is possible to bond the porous materials metallurgically with a sufficiently high mechanical strength. In addition, the consumption of the brazing material is reduced and the advantages of the porous material can be maintained because most of the pores of the porous material are not filled with the molten brazing material.

EXAMPLE

An alloy powder sheet to be used as the brazing material was prepared by a process including the steps of forming a powder mixture consisting essentially of 50 wt % of Fe-Cr alloy powder of a size less than 200 mesh and containing 12.22 wt % of Cr, 0.014 wt % of C, 0.018 wt % of P, 0.79 wt % of Si, 0.003 wt % of S, 0.08 wt % of Mn, 0.08 wt % of Ni and the balance Fe, and 50 wt % of Fe-C-P-Mo alloy powder of a size less than 200 mesh and containing 4.3 wt % of C, 2.46 wt % of P, 10.6 wt % of Mo, 2.73 wt % of Cr, 0.52 wt % of Si, 0.037 wt % of S, 0.37 wt % of Mn, 0.05 wt % of Ni and the balance Fe, forming a solution by dissolving an acrylic resin adhesive (ester acrylate-acrylate copolymer) in 50 vol. parts of toluene, forming and kneading a blend consisting of 92 vol. parts (97.18 wt %) of the mixture powder and 8 vol. parts (2.82 wt %) of the solution of acrylic resin adhesive, and rolling the kneaded blend into the form of an alloy powder sheet having a thickness of 1.0 mm.

On the other hand, two porous sintered members, consisting essentially of 0.4 wt % of C and the balance substantially Fe and having a density of 6.5 g/cm³ were prepared as the members to be bonded. These members had a circular bonding surfaces of 10 mm in diameter. The alloy powder sheet was sandwiched between two porous sintered members with intermediaries of acrylic resin adhesive tape of 30 μm thick. The composition of the adhesive tape was the same as that of the acrylic resin adhesive used in the preparation of the solution. While pressing the alloy powder sheet between two porous metallic members, the end portions of the porous members together with the alloy powder sheet were heated in a hydrogen gas atmosphere up to 300° C. at a heating rate of 15° C./min and maintained at this temperature for 30 minutes. Then, the ends of the porous members and the brazing material were heated up at the same heating rate as the above and was maintained at this temperature for 20 minutes followed by a slow cooling.

FIG. 1 is a microscopic photograph of a section of the bonding region obtained through the process explained hereinbefore. This photograph clearly shows that a microstructure of the brazing material is formed on the sintered member, and the liquid phase component of the brazing material is penetrated into the depth of about 0.35 mm from the surface of the sintered member and then diffused deeper, thus attaining a sufficient bonding.

Figure 2:
FIG. 2 is a photograph showing the secondary electron beam image of the bonding region.
Figure 3:
FIG. 3 and 4 are an Mo $K_\alpha$ characteristic X-ray photograph and a P $K_\alpha$ characteristic X-ray photograph showing the states of diffusion of Mo and P contained by the brazing material through a sintered member.
Figure 4:

FIG. 2 is a photograph showing the secondary electron beam image of the bonding region, while FIGS. 3 and 4 are an Mo $K_\alpha$ characteristic X-ray photograph and a P $K_\alpha$ characteristic X-ray photograph showing the states of diffusion of Mo and P, respectively. From these Figures, it will be understood that the elements such as Mo and P are diffused in the sintered members. It is also understood that Mo and P are spread, respectively, only to the depths of 0.8 mm and 0.6 mm from the surface, i.e., that the brazing material does not penetrate the porous sintered members so deeply.

By way of example, a pair of steel members (S25C) were bonded together at their bonding surfaces of 10 mm dia. by means of a silver-based brazing material, and the bonding strength was compared with that of the structure bonded in accordance with the method of the invention. As a result, it was confirmed that the method of the invention employing the powder sheet as the brazing material provides a bonding strength of 25 to 55 Kg/mm$^2$ which is much higher than the bonding strength (15 to 40 Kg/mm$^2$) attained in the reference bonding with the use of silver-based brazing material. Considering that rocker arms having portions bonded by silver-based brazing material have been put into practical use, it is clear that the structure obtained through bonding method of the invention has a practically sufficient bonding strength.

We claim:

1. A method of bonding a metallic member to an iron-based material having a porous structure, said method comprising the steps of:

preparing a metallic material by combining 30 to 70 wt % of Fe-Cr type alloy powders with 70 to 30 % of Fe-C-P-Mo type eutectic alloy powders which are finer than 150 mesh, said Fe-Cr type alloy containing 10 to 15 weight % Cr, and less than 1.5 weight % of at least one of C, P, Si, S, Mn and Ni, and the balance Fe, and said Fe-C-P-Mo eutectic alloy containing 3.5 to 4.5 weight % C, 1.8 to 2.8 weight % P, 8 to 12 weight % Mo, less than 4 wt % of at least one of Cr, Si, Mn and Ni, and the balance Fe,;

mixing 90 to 99% of said metallic material with 10 to 1% of an organic binder comprising an acrylic resin to form a brazing material;

placing said brazing material between said metallic member and said iron-based material;

preheating said brazing material at 150° to 380° C. for at least 5 minutes to cause said organic binder to become adhesive so that said metallic member and said iron-based material remain securely intact during subsequent bonding steps;

heating said brazing material, said metallic member and said iron-based material to a temperature above the melting point of said brazing material so that the elements of the eutectic powders of said brazing material diffuse into the surfaces of the pores of said iron-based material; and preventing further diffusion of said brazing material into said pores by cooling said brazing material, said metallic member, and said iron-based material.

2. A method in accordance with claim 1 in which said brazing material is in the form of a sheet, said placing step including a step of attaching said sheet of the brazing material to at least one of the metallic members by means of an adhesive.

3. A method in accordance with claim 1 in which said acryl resin is one of polymers and copolymers of an ester acrylate and an ester methacrylate, and polymeric monomers having functional group copolymerizable with these esters.

4. A method in accordance with claim 1 in which said brazing material contains at least one of Cr, V, W, Nb, Ta and Ti.

5. A method in accordance with claim 1 in which said metallic member of a porous structure (is made of an iron base sintered material), the heating step being carried out in a non-oxidizating atmosphere.

6. A method in accordance with claim 2 in which said adhesive is an acrylic resin.

7. A method in accordance with claim 6 in which said acryl resin is one of polymers and copolymers of an ester acrylate and an ester methacrylate, and polymeric monomers having functional group copolymerizable with these esters.

* * * * *